United States Patent
Barth et al.

(10) Patent No.: US 8,434,524 B2
(45) Date of Patent: May 7, 2013

(54) ELASTIC HYDRAULIC ACCUMULATOR/RESERVOIR SYSTEM

(75) Inventors: Eric J. Barth, Nashville, TN (US); Alexander V. Pedchenko, Nolensville, TN (US)

(73) Assignee: Vanderbilt University, Nashville, TN (US)

( * ) Notice: Subject to any disclaimer, the term of this patent is extended or adjusted under 35 U.S.C. 154(b) by 49 days.

(21) Appl. No.: 13/017,118

(22) Filed: Jan. 31, 2011

(65) Prior Publication Data

US 2012/0192979 A1 Aug. 2, 2012

(51) Int. Cl.
*F16L 55/04* (2006.01)

(52) U.S. Cl.
USPC .................... 138/30; 138/26; 92/90

(58) Field of Classification Search ............ 138/30, 138/26; 92/90
See application file for complete search history.

(56) References Cited

U.S. PATENT DOCUMENTS

| | | | |
|---|---|---|---|
| 2,721,580 A | 10/1955 | Greer | |
| 3,353,606 A | 11/1967 | Dyer | |
| 3,632,557 A | 1/1972 | Brode et al. | |
| 3,791,557 A | 2/1974 | Venus, Jr. | |
| 3,797,516 A | 3/1974 | Forster et al. | |
| 3,933,172 A * | 1/1976 | Allen | 137/494 |
| 4,315,562 A | 2/1982 | Tangorra et al. | |
| 4,333,553 A | 6/1982 | Hoppie et al. | |
| 4,479,356 A | 10/1984 | Gill | |
| 4,520,840 A | 6/1985 | Michel | |
| 4,533,067 A | 8/1985 | Sansevero, Jr. et al. | |
| 4,741,155 A * | 5/1988 | McCarty | 60/772 |
| 5,152,455 A * | 10/1992 | Palmers | 239/73 |
| 5,511,759 A | 4/1996 | DeKraker et al. | |
| 5,682,923 A * | 11/1997 | Goloff et al. | 138/30 |
| 5,814,064 A | 9/1998 | Daniel et al. | |
| 5,857,618 A | 1/1999 | Restive | |
| 6,007,582 A | 12/1999 | May | |

(Continued)

FOREIGN PATENT DOCUMENTS

| | | |
|---|---|---|
| DE | 2551580 A | 5/1977 |
| WO | WO2008045468 A1 | 4/2008 |
| WO | WO2010117853 A1 | 10/2010 |

OTHER PUBLICATIONS

Pourmovahed, A., Baum, S.A., Fronczak, F.J., and Beachley, N. H., "Experimental Evaluation of Hydraulic Accumulator Efficiency With and Without Elastomeric Foam". Journal of Propulsion and Power, vol. 4(2), Mar.-Apr. 1988, pp. 185-192.

(Continued)

*Primary Examiner* — Patrick F Brinson
(74) *Attorney, Agent, or Firm* — Wyatt, Tarrant & Combs, LLP

(57) ABSTRACT

The invention is a combination accumulator and reservoir which stores energy when the accumulator deforms from its original shape in response to the flow of a pressurized fluid from the reservoir. The stored energy is returned when the fluid flow is reversed and the accumulator discharges the fluid and returns to its original shape. At least one part of the novelty of the invention is that the accumulator and the fluid reservoir reside in the same housing such that the volume of each varies inversely. Accordingly, the invention is more compact and weighs less than conventional accumulators. Another feature of the invention is that fluid is located around the bladder accumulator to lubricate contact between the bladder and sides of the reservoir.

11 Claims, 7 Drawing Sheets

U.S. PATENT DOCUMENTS

| | | | |
|---|---|---|---|
| 6,200,114 | B1 | 3/2001 | Brighton et al. |
| 6,267,147 | B1 * | 7/2001 | Rago .............................. 138/31 |
| 6,336,467 | B1 | 1/2002 | Schneider |
| 7,841,432 | B2 | 11/2010 | Lynn et al. |
| 7,913,791 | B2 | 3/2011 | Rose et al. |
| 2002/0153687 | A1 | 10/2002 | Howard |
| 2005/0096171 | A1 | 5/2005 | Brown et al. |
| 2006/0037658 | A1 | 2/2006 | Shimbori et al. |
| 2007/0126284 | A1 | 6/2007 | Swain et al. |
| 2008/0308168 | A1 | 12/2008 | O'Brien, II et al. |
| 2009/0165451 | A1 | 7/2009 | Mueller et al. |
| 2011/0079140 | A1 | 4/2011 | Baseley |

OTHER PUBLICATIONS

Ashby, M.F., "Materials Selection in Mechanical Design", Pergamon Press, Oxford, 1992, pp. 32-35.

Pourmovahed, A., "Energy Storage Capacity of Gas-Charged Hydraulic Accumulators". AIAA Thermophysics, Plasmadynamics and Lasers Conference, Jun. 27-29, 1988, San Antonio, TX, pp. 1-11.

Pedchenko A., and Barth E., "Design and Validation of a High Energy Density Elastic Accumulator Using Polyurethane" ASME 2009 Dynamic Systems and Control Conference, Hollywood, California, Oct. 12-14, 2009, vol. 1, pp. 283-290.

* cited by examiner

ELASTIC HYDRAULIC ACCUMULATOR/RESERVOIR SYSTEM

STATEMENT REGARDING FEDERALLY SPONSORED RESEARCH OR DEVELOPMENT

This invention was made, in part, with federal grant money under the National Science Foundation's Engineering Research Center for Compact and Efficient Fluid Power, grant number 0540834. The United States Government has certain rights in this invention.

REFERENCE TO A MICROFICHE APPENDIX

Not applicable

BACKGROUND OF THE INVENTION

One of the most pressing challenges in the design of an accumulator is the fabrication of a light weight and compact device that may be used in various industries. Hydraulic accumulators are energy storage devices commonly used to provide supplementary fluid power and absorb shock. One particularly interesting recent application of these devices is regenerative braking. Although a theoretically appealing concept, hydraulic regenerative braking (HRB) is difficult to implement due to some major inherent limitations and non-deal properties of conventional accumulators.

Gas bladder accumulators and piston accumulators with a gas pre-charge (PAGPs) use gas for energy storage and, therefore, are much lighter than their spring piston counterparts. In these accumulators, a gas, separated by a bladder or a piston, occupies a certain volume of a container which is otherwise filled with a fluid, typically hydraulic fluid. As fluid is forced into this container, the gas inside the separated volume is compressed and energy is stored in this compressed gas. Such accumulators are subject to two serious drawbacks: 1) inefficiency due to heat losses, and 2) gas diffusion through the bladder into the hydraulic fluid. The drawback of inefficiency via heat loss is addressable, but the gas diffusion issues gives rise to high maintenance costs associated with "bleeding" the gas out of the fluid often.

With regard to inefficiency, if the energy stored in the compressed gas of such an accumulator is not retrieved soon, the heat flow from the gas to its immediate surrounding results in much less energy being retrieved. It has been shown that with as little as 50 seconds passing between gas compression and expansion, a piston-type gas accumulator's efficiency can fall to about 60%. Pourmovahed, A., Baum, S. A., Fronczak, F. J., and Beachley, N. H., 1988. "Experimental Evaluation of Hydraulic Accumulator Efficiency With and Without Elastomeric Foam". *Journal of Propulsion and Power,* 4(2), March-April, pp. 188. Since a vehicle remains immobile at a stop light for such a length of time or longer, this makes gas bladder and piston accumulators with a gas pre-charge not ideal for HRB applications. Several methods to mitigate these heat losses have been proposed. For piston accumulators with a gas pre-charge, one method involves placing an elastomeric foam into the gas enclosure. This foam serves the purpose of absorbing the generated heat during gas compression that would otherwise be transferred to the walls of the gas enclosure, and ultimately lost. The foam is capable of collecting a large amount of this generated heat and returning it to the gas when the latter expands. According to Pourmovahed, "the insertion of an appropriate amount of elastomeric foam into the gas enclosure . . . [can] virtually eliminate thermal loss". Pourmovahed, A., Baum, S. A., Fronczak, F. J., and Beachley, N. H., 1988. "Experimental Evaluation of Hydraulic Accumulator Efficiency With and Without Elastomeric Foam". *Journal of Propulsion and Power,* 4(2), March-April, pp. 188. Incorporation of elastomeric foam has shown how gas-charged accumulator efficiency can be improved, however, this modification still does not solve the other problems associated with existing accumulators.

With regard to gas diffusion, the problem persists despite developments in the material used for the bladder that separates the gas and fluid due to the fact that diffusion can be reduced but not eliminated completely. This is the case due to the pressure gradient across the bladder from the gas to the fluid. This gradient is zero when the accumulator is in static equilibrium. However, when the accumulator is discharging for example, there is a gradient of higher pressure on the gas side to lower pressure on the fluid side that drives the gas through the bladder and into the fluid. Possible solutions to this problem are to either ensure that the gas is always at a lower pressure than the fluid, or to eliminate the existence of gas altogether.

SUMMARY OF INVENTION

The present invention discloses an accumulator/reservoir system for storing hydraulic energy. The disclosed system provides a compact, space saving design, in which the accumulator and the reservoir share space. That is, the low pressure reservoir of the hydraulic system is combined into the same space as the high pressure accumulator. Accordingly, the present invention requires less space and is lighter weight than traditional accumulator systems. A second feature of the system is that the fluid around the bladder accumulator lubricates the contact between the bladder and sides of the reservoir. This allows for decreased sliding friction as the bladder changes shape. The disclosed accumulator/reservoir system provides a method of storing strain energy in a fluid based system so that gas at a pressure greater than that of the fluid does not defuse into the fluid.

In certain embodiments, the accumulator system includes, a housing, wherein the housing defines a reservoir, a bladder attached to the housing, wherein the bladder is contained within the housing, a fluid, wherein the fluid is inside the bladder and in the reservoir surrounding the bladder so that movement of the bladder against the housing is lubricated. In certain embodiments, the fluid is a hydraulic fluid. In other embodiments, the system further includes a pump/motor in fluid communication with the bladder and reservoir. In still other embodiments, the system further includes a first fluid conduit attached to the housing and the pump/motor, a seal attached to the bladder, and a second fluid conduit attached to the pump/motor and the seal. In certain embodiments, the seal has a diameter greater than a diameter of the bladder so that removal of the seal allows for removal and replacement of the bladder.

In other embodiments, disclosed herein is a compact accumulator system including, a fluid reservoir, a bladder in fluid communication with the fluid reservoir, wherein the fluid reservoir and the bladder are contained within the same structure so that the accumulator system is compact, a fluid in communication with the bladder and the fluid reservoir, and a pump/motor in fluid communication with the bladder and the fluid reservoir. In certain embodiments, the accumulator system is a closed system. In other embodiments, the accumulator system is an open system. In still other embodiments, the system includes an overflow reservoir in fluid communication with the fluid reservoir and the pump/motor so that the opening to atmospheric pressure is on the low pressure side of the system. In yet other embodiments, the system further includes a bracket attached to the housing so that the system may be mounted for energy use. In other embodiments, the present invention is a method of storing strain energy in a fluid based accumulator system so that gas at a pressure greater than that of the fluid does not defuse into the fluid, including providing a fluid in a fluid reservoir, providing the fluid in an expandable bladder, wherein the expandable bladder is located within the fluid reservoir, pumping the fluid from the fluid reservoir into the expandable bladder so that the bladder expands, slidably engaging contact between the expanding bladder and the fluid reservoir, wherein the fluid within the fluid reservoir lubricates such engagement, releasing the stored strain energy to perform work as the fluid moves through the pump/motor, and receiving the fluid in the fluid reservoir from the expandable bladder as the expandable bladder returns to its non-expanded configuration.

Accordingly, one provision of the invention is to provide an accumulator/reservoir system having a compact design.

Still another provision of the invention is to provide an accumulator/reservoir system having lubrication of the contact between the expandable bladder and the walls of the reservoir.

PREFERRED EMBODIMENTS OF THE INVENTION

Figure 1A:
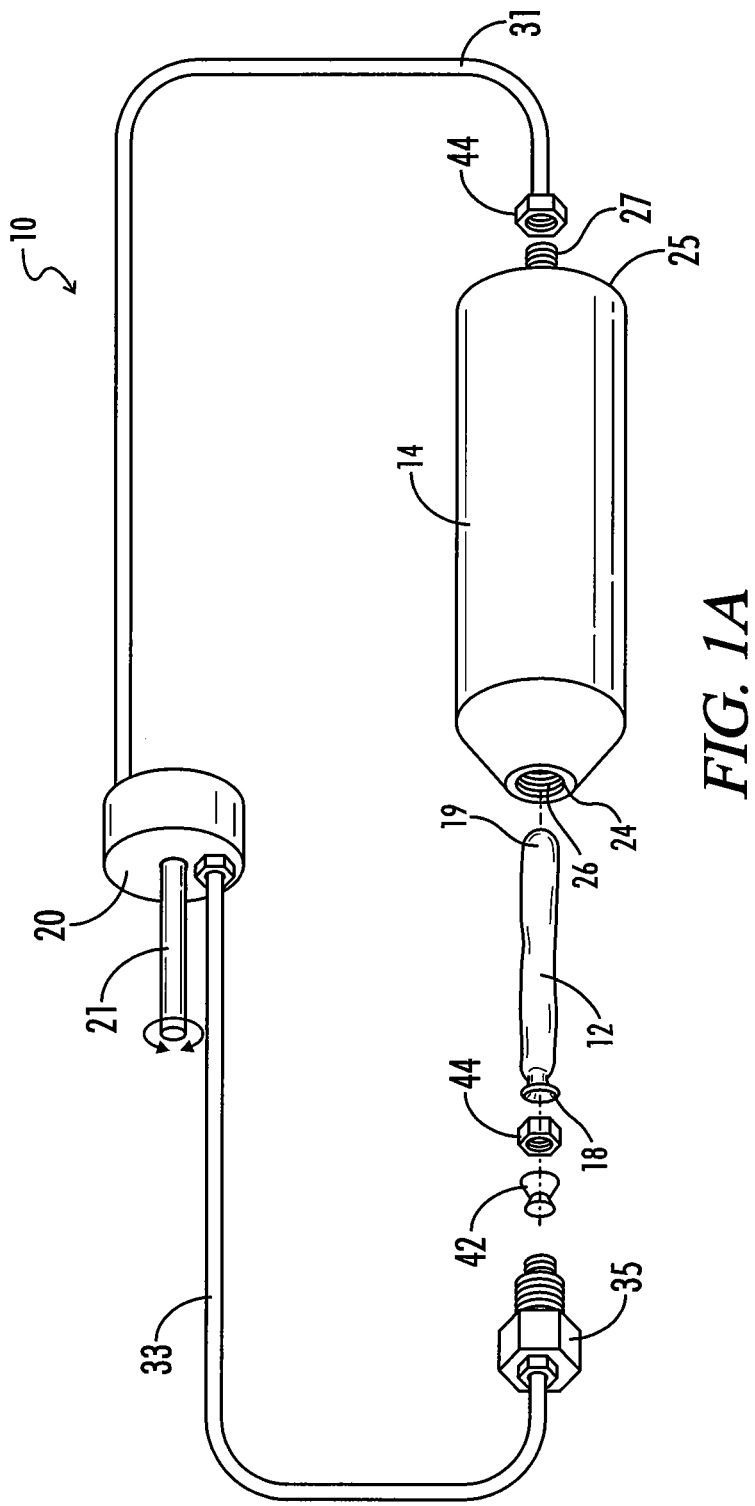
FIGS. 1A and 1B are perspective views of embodiments of the present invention. Shown in FIG. 1A is a closed system having a reservoir, bladder, housing seal, pump/motor and axle. Shown in FIG. 1B is an open system having a reservoir, bladder, housing seal, pump/motor, axle, and overflow reservoir. The open system is open to atmospheric pressure on the low pressure side. Also shown in each figure are the fluid conduits.

The present invention discloses a combined hydraulic accumulator and low pressure reservoir 16. This application discloses the way in which the low pressure reservoir 16 of a hydraulic system 10 may be combined into the same space as the high pressure accumulator if an elastic accumulator is used (where "high pressure accumulator" then refers to an elastic bladder 12 contained within the housing 14 which defines the reservoir 16. As shown and described herein, the invention is to utilize a high strain-energy density elastic accumulator (as opposed to a gas-charged or spring loaded piston accumulator) within a rigid shroud, also called a housing 14. As the inside of the elastic bladder 12 is filled (using a pump/motor 20, or other means), the volume around the bladder 12 decreases. Given that most elastic materials are incompressible and occupy appreciably the same volume regardless of their shape, the total combined volume of 1) the fluid 30, which may be hydraulic fluid, in the bladder 12, plus 2) the volume of hydraulic fluid 30 outside the bladder 12 within the reservoir 16, plus 3) the volume of the elastic material, will remain appreciably constant. This fact allows the space around the bladder 12 to act as the low pressure side of a hydraulic system 10 (typically as separate device or tank referred to as a reservoir).

For applications such as regenerative braking in a hydraulic hybrid vehicle, it is critically important that the hydraulic system is compact. This invention allows the role of the accumulator and the reservoir 16 to be combined compactly into a single space effectively reducing the overall volume of the system 10 by approximately half. With a more conventional hydraulic system where the accumulator and reservoir are two separate devices occupying their own fixed volumes, regardless of how much hydraulic fluid is in either, the respective device will occupy the same physical volume. In the present invention, the accumulator volume and the reservoir 16 volume are variable. Given that one volume increases at the exact rate that the other decreases, the two volumes can co-occupy overlapping spaces.

A second feature of the present invention is that the fluid 30 around the bladder 12 (in the reservoir 16 space) lubricates the contact between the bladder 12 and the housing 14. This allows the bladder 12 to contact the housing 14 as designed while decreasing sliding friction and wear on the bladder 12.

A third feature of the present invention is that the low pressure reservoir 16 side may either be open to atmospheric pressure, or sealed as part of the complete hydraulic system. If sealed, the accumulator/reservoir system 10 acts on the differential pressure between the high and low pressure sides as opposed to the gage pressure of the high pressure side.

As best seen in FIGS. 2-7, which are fully described below, an elastic bladder 12 is shown contained inside a rigid shroud, or housing 14. Fluid 30 occupies the space inside the bladder 12 and outside the bladder 12 within the reservoir 16 space. In the embodiment shown, a hydraulic pump/motor 20 is shown connecting the low pressure side to the high pressure side (inside the bladder 12). This embodiment is shown for an application such as regenerative braking whereby the pump/motor 20 is physically connected to the power-train of an automobile. When the pump/motor 20 is absorbing mechanical energy, it acts as a pump and moves hydraulic fluid 30 from the low pressure side and into the high pressure side, stretching and increasing the volume in the bladder 12. The volume outside the bladder 12 reduces by the same amount, and at the same rate at each instant in time, as the volume inside the bladder 12 is increasing. When the pump/motor 20 acts as a hydraulic motor to deliver the energy stored in the bladder 12 (stored in the form of strain energy of the elastic material of the bladder 12) to shaft work at the output of the motor, the elastic bladder 12 forces high pressure hydraulic fluid 30 through the motor from the high pressure side to the low pressure side. As this occurs, the volume in the bladder 12 decreases at the same rate at all points in time as the volume of hydraulic fluid 30 increases outside the bladder 12 in the reservoir 16 space. In certain embodiments of the invention, hydraulic actuators and valves are connected to either the high or low pressure side as known to those of ordinary skill in the art. Such actuators and valves are well known in the art and are readily commercially available. In still other embodiments of the invention, a small low pressure reservoir (of the conventional type) may also be connected as needed to the low pressure side—this, for example, would be needed to account for the asymmetric volume of fluid of single-rodded hydraulic pistons. Applicant notes that in the case where a conventional reservoir is used in this manner, it's required size will be much smaller than otherwise needed without the invention as described herein.

Figure 1B:
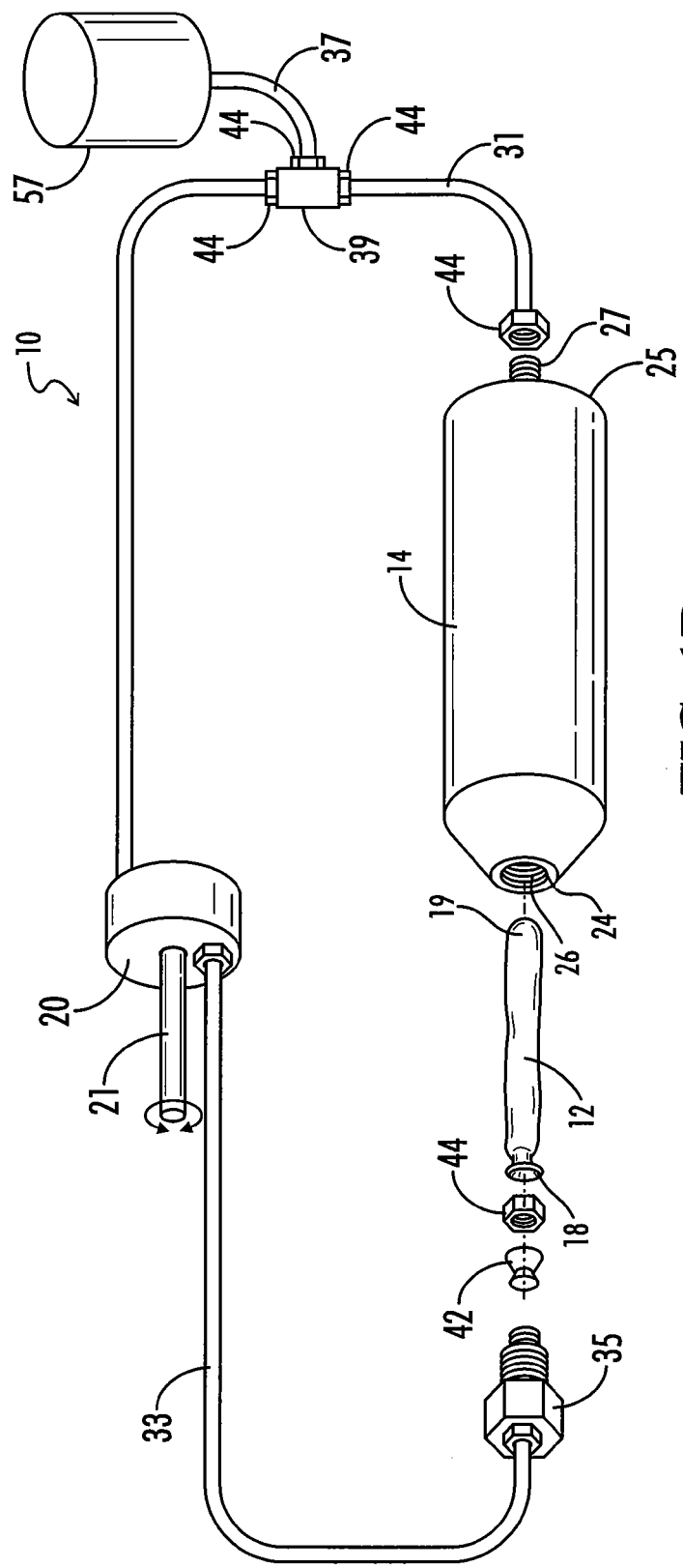
Figure 2:
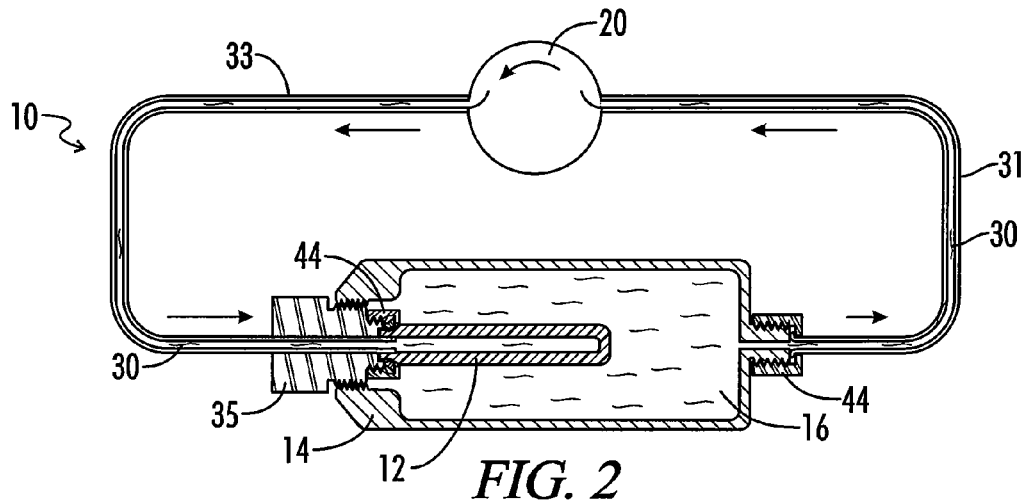
FIG. 2 is a cross-sectional view of an embodiment of the present invention. Shown there is a combined accumulator, having a bladder, and a reservoir. The bladder contains fluid but is in a non-expanded configuration. Such configuration will change as pressure from the pump fills the bladder with fluid and the bladder expands, as shown in FIGS. 3 and 4. Fluid from the reservoir is pumped into the bladder.
Figure 3:
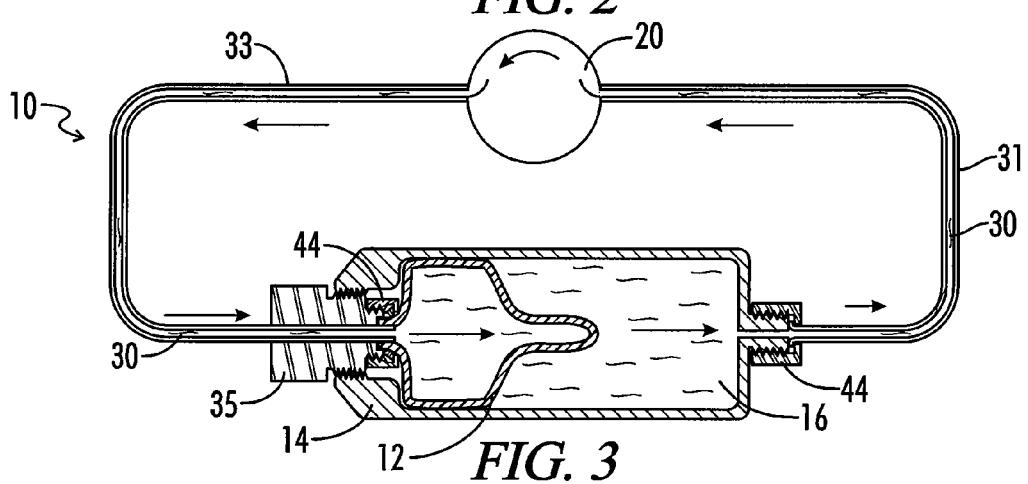
FIG. 3 is a cross-sectional view of the embodiment shown in FIG. 2 after some pressurized fluid has partially expanded the bladder. The increase in fluid volume of the bladder is the same as the decrease in fluid volume of the reservoir.
Figure 4:
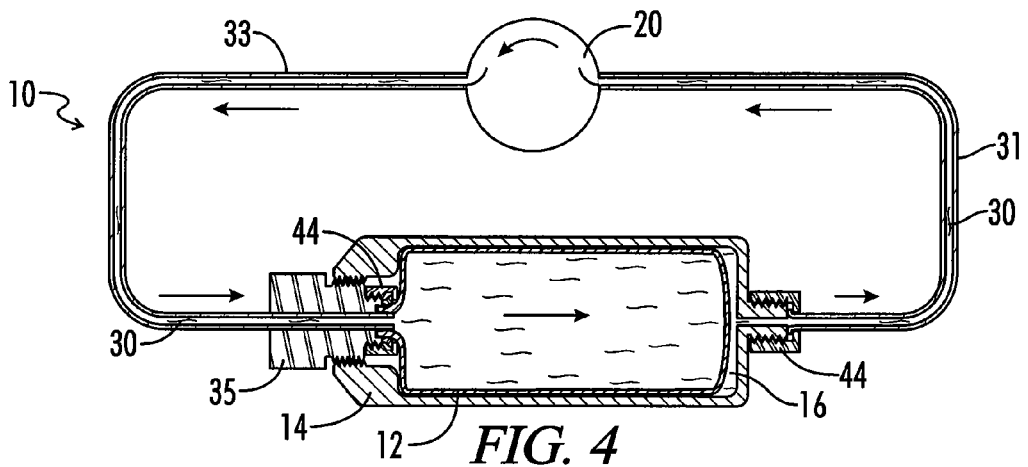
FIG. 4 is a cross-sectional view of the embodiment shown in FIG. 3 after the pressurized fluid further expanded the bladder. Shown therein is a bladder full of fluid which is nearly fully expanded into the area of the reservoir. The reverse process of the bladder contracting will forcibly eject the fluid under pressure so that energy delivered to the pump/motor. Upon release from the bladder, the fluid travels through the conduits to the reservoir. Also shown is that the protective housing limits the radial expansion of the bladder.
Figure 5:
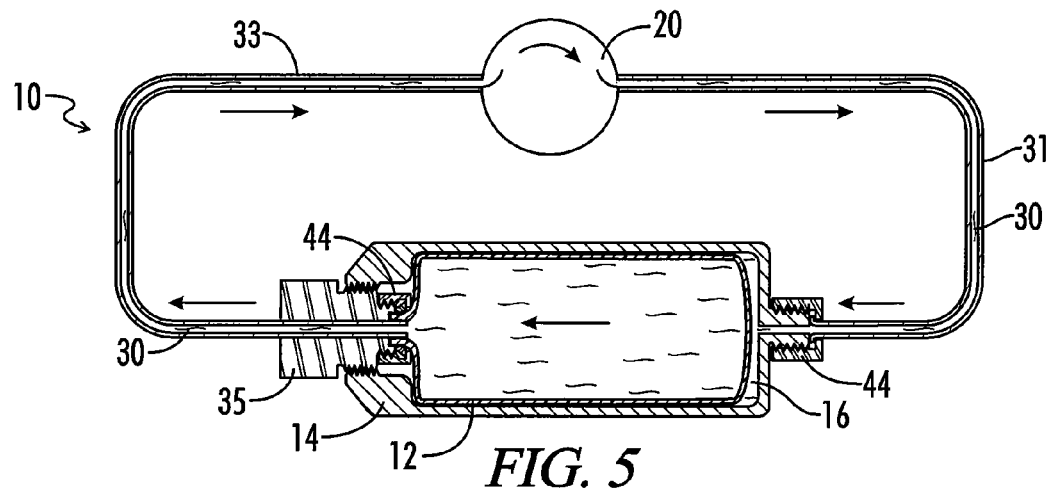
FIG. 5 is a cross-sectional view of the embodiment shown in FIG. 4. As the fluid is released from the bladder it travels through the pump/motor so that the energy may be used for work, as for example, by rotating the axle of the pump/motor.
Figure 6:
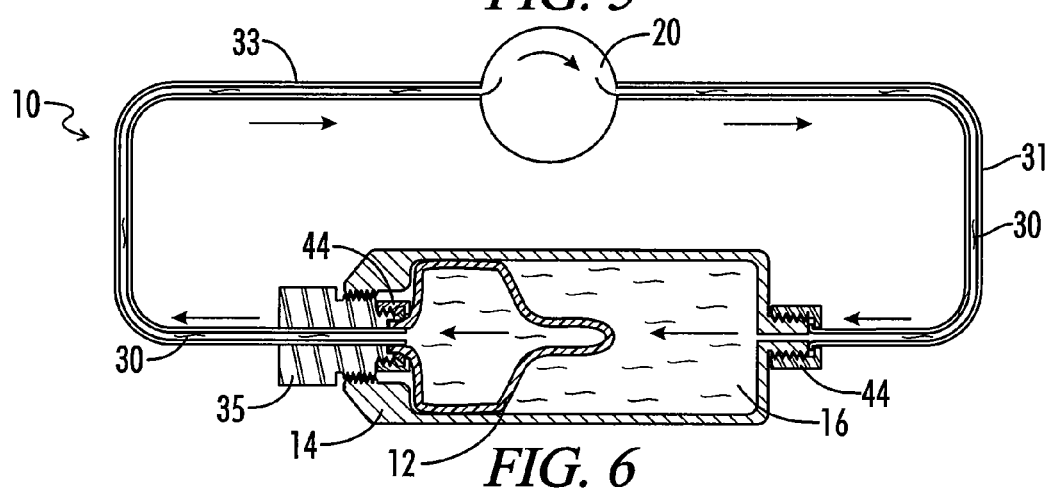
FIG. 6 is a cross-sectional view of the embodiment shown in FIG. 5. Fluid continues to be released from the bladder to the fluid conduits, through the pump/motor and into the reservoir.
Figure 7:
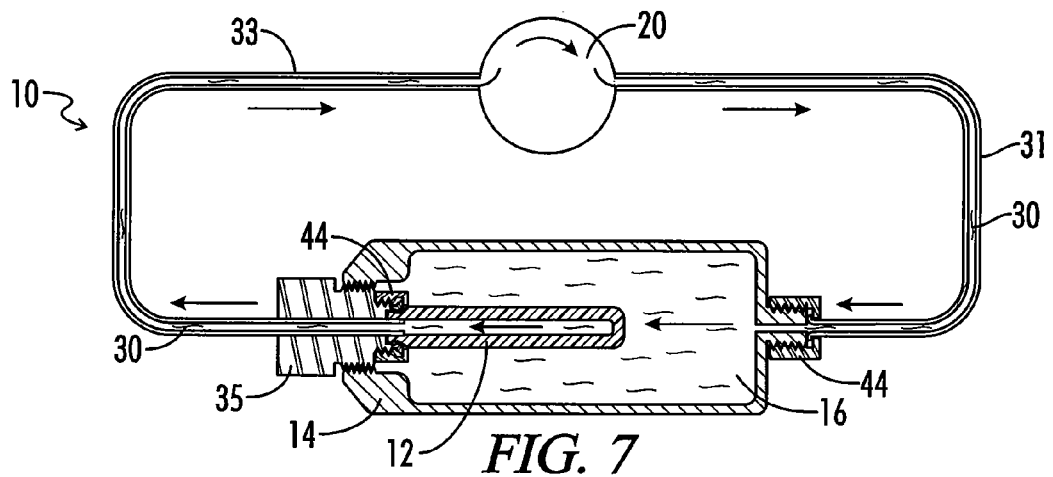
FIG. 7 is a cross-sectional view of the embodiment shown in FIG. 6. The bladder has reconfigured to its non-stretched configuration. The bladder still contains fluid. When in this configuration, use of the system may start over, as shown in FIG. 2.

Referring now to FIG. 1, there is shown two embodiments of the present invention. FIG. 1A shows an exploded view of a closed system embodiment of the present invention. That is, the system 10 is a sealed system. FIG. 1B shows an exploded view of an open system embodiment of the present invention. Shown therein is an overflow reservoir 57. Specifically, a third fluid conduit 37 is attached between the first fluid conduit 31 (which is the low pressure side of the pump/motor 20) and the overflow reservoir 57. The overflow reservoir 57 is open to atmospheric pressure. In certain embodiments, the third fluid conduit 37 may be attached to the system 10 by way of a t-fitting 39, or the like, as known to those of ordinary skill in the art. As previously described above, the bladder 12 repetitively expands and returns appreciably to its original shape without fatigue. Surrounding the bladder 12 of the system 10 is a housing 14 which defines a reservoir 16 and limits the radial expansion of the bladder 12 in order to prevent plastic deformation of the bladder 12 resulting from overexpansion. In use, a fluid 30, such as hydraulic fluid, enters the bladder 12 under pressure generated by a pump/motor 20 and expands the bladder 12 to a point of contact with the housing 14. As best seen in FIGS. 2-4, fluid 30 from the reservoir 16 is pumped through the first fluid conduit 31, through the pump/motor 20, and through the second fluid conduit 33 into the bladder 12. When it is desirable to retrieve the stored energy, fluid flow is reversed and forcibly ejected, thereby converting strain energy back into hydraulic energy as the bladder 12 reverts to its original shape and configuration as shown in FIGS. 5-7. Again, placing the reservoir 16 within the same housing 14 as the bladder 12 results in a system 10 that costs less to manufacture and requires less space and weight to operate.

The system 10 includes a tubular expandable bladder 12 within a housing 14. The neck 18 of the bladder 12 is attached to second fluid conduit 33 so that the body 22 of the bladder 12 may expand and retract as disclosed herein. The second fluid conduit 33 has a seal 35 to attach the second fluid conduit 33 to the housing 14 in a fluid tight manner. The first end 24 of the housing 14 includes an opening 26 through which the bladder 12 is inserted. In certain embodiments, a replacement bladder 12 may be inserted into the housing 14 through the opening 26 and by use of the seal 35, the juncture is fluid tight.

Hydraulic Accumulators

By way of background, for a hydraulic accumulator the volumetric system energy density can be derived using the following equations:

$$V_{fluid} = \frac{E_{stored}}{P} \quad (1)$$

$$V_{storage\_device} = \frac{E_{stored}}{e_{storage\_device}} \quad (2)$$

Where $V_{fluid}$ is the volume of the fluid used for energy storage, $E_{stored}$ is the amount of energy stored in the system, P is the pressure at which energy storage occurred, $V_{storage\_device}$ is the volume of the energy storage device (where the energy storage device is defined as everything other than pressurized fluid), and $e_{storage\_device}$ is the volumetric energy density of the energy storage device. Using equations (1) and (2) in conjunction with the definition of volumetric energy density we obtain the system volumetric energy density, $$e_{system} = \frac{E_{stored}}{V_{storage\_device} + V_{fluid}} \quad (3)$$

The present invention is a compact, light weight energy storage device. The invention has a low cost of manufacturing and low/no maintenance. In certain embodiments of the present invention, the system 10 may be used in a fluid powered automotive regenerative braking system (hydraulic hybrid) linked to a hydraulic drive system. Such a system 10 is appropriate for either series or parallel hydraulic hybrid vehicles. Energy storage of 200 kJ of energy (3500 lbs at 35 mph) at a peak power of 90 kW (35 mph to zero in 4.5 second) is needed in a package of acceptable weight and volume for a compact to midsized passenger vehicle (accumulator system energy density >10 kJ/liter). The present invention aims to remedy the problems of traditional accumulators by (i) reducing fabrication cost, (ii) eliminating the need for maintenance caused by gas diffusion by avoiding the use of a gas precharge, and (iii) greatly reducing the loss of energy due to heat transfer to the environment compared to that present in a conventional gas pre-charged accumulator. In part, the problems of traditional accumulators are avoided as the present invention uses an energy storage mechanism not traditionally utilized in existing accumulators. Further, placement of the reservoir 16 within the housing 14 allows for a much preferred compact unit which potentially costs less and weighs less since an independent and separate fluid reservoir is not needed.

As background, a conventional braking system uses friction between brake pads and a brake disk or drum to slow a vehicle. This method results in energy being dissipated as heat. In contrast, regenerative braking harnesses the kinetic energy of a vehicle during braking, instead of letting it dissipate in the form of heat. This collected energy can then be used in vehicle acceleration, thereby increasing the fuel efficiency, or more generally increasing the efficiency of use of the primary stored energy which can be in several forms including but not limited to hydrocarbon fuel. Hydraulic regenerative braking (HRB), specifically, decelerates wheel rotation by having the drivetrain operate a pump that pumps a fluid into a device which resists this fluid's flow and stores the resulting decrease in the kinetic energy of the vehicle. Although a theoretically appealing concept, hydraulic regenerative braking is difficult to implement due to some major inherent weaknesses of conventional accumulators.

The primary weakness of spring piston accumulators that prohibits them from being used in HRB is their low gravimetric energy density. Using linear analysis, spring steels and titanium alloys have a gravimetric energy density of around 1 to 1.5 kJ/kg. M. F. Ashby, *Materials Selection in Mechanical Design*, Pergamon, Oxford, 1992. Consequently, in order to store enough energy to bring a mid-sized 4-door sedan (mass=3500 lb (1590 kg)) to rest from 35 mph (15.65 m/s), the accumulator spring would have to weigh somewhere from 130 kg to 195 kg. In automotive manufacturing, where minimizing vehicle weight is vital, including such a heavy component would be largely impractical.

Design of the Present Invention

In order to ensure that the design of the present invention is suitable for implementation in HRB for a passenger vehicle, rough performance criteria exist, which include: (i) capable of storing 200 kJ of energy at a peak power of 90 kW; (ii) volumetric energy density of 5 MJ/m³ or above; (iii) gravimetric energy density of 5 kJ/kg or above. The 200 kJ storage capacity requirement was arrived at by using the classical mechanics equation for kinetic energy, equation four ("Eq. (4)"), below, where $E_k$ is kinetic energy in joules ("J"), m is mass in kg and v is velocity in meters per second (m/s).

$$E_k = \frac{1}{2}mv^2 \quad (4)$$

An average 4-door sedan has a mass of approximately m=3500 lbs (1590 kg). Working under the simplifying assumption that a vehicle of this weight is a point mass experiencing translational rigid body motion of v=35 mph (56.3 km/h) without rotation (allowing the use of Eq. (4)), $E_k$=194,713 J≈200 kJ. This number represents the amount of energy that would be dissipated as heat in traditional braking to stop the vehicle. In HRB, this is the amount of energy that the system should capture, assuming 100% efficiency.

The gravimetric energy density requirement was prescribed to 5 kJ/kg in order to ensure that the accumulator 10 would not significantly augment the vehicle's weight. Under this constraint, an accumulator 10 capable of storing 200 kJ of energy would weigh no more than 40 kg, barring the working fluid. The volumetric energy density restriction was chosen to be similar to the volumetric energy density of titanium alloys. This limit guarantees that the accumulator 10 will not take up more than 0.04 m³, excluding the working fluid.

For example, to see which materials meet the energy density requirements, CES Material Selector version 4.8.0 was used, which is readily commercially available, from Granta Design Limited. The CES Material Selector is a software package with an extensive materials and manufacturing processes database; it was employed specifically for its capability to graphically compare user defined material properties. In the initial selection process all material groups were considered. The material volumetric energy density values of certain groups were calculated under the assumption of linear elasticity using Eq. (5), $$u = (\sigma_y^2)/(2E) \quad (5)$$

where u is volumetric energy density of the material in J/m³, $\sigma_y$ is the material's yield stress in Pa and E is the material's elastic modulus in Pa. The material's gravimetric energy densities in J/kg, represented by e, were then calculated by simply dividing a given material's volumetric energy density in J/m³ obtained from Eq. (5), u, by its mass density in kg/m³, ρ, as shown in Eq. (6).

$$e = u/\rho \quad (6)$$

Several elastomeric materials boast much higher values for both volumetric and gravimetric energy densities than those exhibited by other material families. Of these elastomeric materials, polyurethane and natural rubber not only greatly exceed the specified target metrics for energy densities, but also surpass all other materials in these categories. In fact, polyurethane's gravimetric energy density is about two orders of magnitude higher than that of titanium alloys. Although both rubber and polyurethane appear to be suitable materials for construction of the bladder 12, due to the larger possible maximum values and its commercial availability, polyurethane is a good choice of material for the invention described herein, in certain embodiments. It is important to note here that strain hardening makes the application of linear elasticity to elastomers a practice that should be used cautiously. In order to obtain a far more accurate estimate of energy storage capabilities, a stress-strain curve of the material should be reviewed.

In certain embodiments of the system 10, the bladder 12 has notches 34, as further described below, in order to promote radial expansion. Such expansion helps to ensure that the majority of the fluid 30 to be transported from the reservoir 16 to inside the bladder 12 is positioned near the second end 25 of the housing 14 so that such fluid 30 may readily travel through the second opening 27 of the housing 14 into the first fluid conduit 31, as best seen in FIGS. 2-4. This type of axial expansion behavior is further discussed conceptually below, in relation to the selection of a material of construction for the bladder 12. A system 10 following this type of expansion behavior may have energy stored in the system 10 estimated using Eq. (7).

$$E_{est} = P_{hold}(V_f - V_i) \tag{7}$$

$E_{est}$ is an estimate of stored energy in J, $P_{hold}$ is the constant gauge pressure at which expansion propagates in Pa, $V_{init}$ is the initial volume occupied by the system 10 containing the working fluid before it is loaded, and $V_f$ is the maximum volume occupied by the system 10 containing the working fluid at the end of loading in m³.

Using Eq. (7) and letting $E_{est}$ equal 200 kJ, estimates for $(V_f - V_{init})$ were obtained for different $P_{hold}$ values. Additionally, assuming a working fluid of a similar density to hydraulic fluid (taken to be $\rho_{hyd}$=890 kg/m3), the obtained $(V_f - V_{init})$ estimates were in turn used to obtain change in system mass approximations in kg, $M_f$. Values for $(V_f - V_{init})$ and $M_f$ that would result in energy storage of 200 kJ for different values of $P_{hold}$, are shown below. The values are the volume and mass estimates for working fluid.

| $P_{hold}$, psig [kPa] | $(V_f - V_{init})$, ft³ [m³] | $M_f$ lb [kg] |
|---|---|---|
| 3000 [20786] | 0.333 [0.0094] | 18.45 [8.37] |
| 4000 [27680] | 0.250 [0.0071] | 13.93 [6.32] |
| 5000 [34575] | 0.200 [0.0057] | 11.18 [5.07] |

As can be seen above, for the accumulator system capable of functioning with $P_{hold}$ values ranging between 3000 psig and 5000 psig, the working fluid outside of the bladder 12 prior to loading is estimated to weigh between roughly 11 lbs and 19 lbs (5 kg and 9 kg) and occupy between 0.2 ft³ and 0.33 ft³ (0.006 m³ and 0.009 m³). Although these mass and volume values do not account for the initial volume and mass of the system, their small magnitudes serve to indicate that an elastomeric accumulator 10 should theoretically be a viable option for HRB application.

Bladder Properties

In order to examine the properties of a first embodiment of a bladder 12 that was constructed, a structure 100 was constructed. In an embodiment of the present invention, a bladder 12 was constructed of Andur RT 9002 AP, which is a polyurethane commercially available from Anderson Development Company of Adrian, Mich. The bladder 12 is a room temperature curable polyurethane which allows the bladder 12 to be cast using a disposable wax mold that is subsequently melted away from the finished bladder 12. A few mechanical properties of the Andur RT material, as specified by the manufacturer, are listed below. The material possesses a high maximum elongation while also maintaining a relatively high elastic modulus, making it a viable material candidate for the system 10 disclosed herein.

| Physical property | Imperial Value | Metric Value |
|---|---|---|
| Tensile Strength | 2100 psi | 14.48 MPa |
| Elastic Modulus @ 100% elongation | 790 psi | 5.45 MPa |
| Elastic Modulus @ 300% elongation | 1200 psi | 8.27 MPa |
| Maximum elongation | 600% | |

The following are the dimensions of the bladder 12 constructed of Andur RT 9002 AP: 3.5 inches long, and a thickness of from about 1.5 to about 1.8 inches.

Using the equation for energy stored per unit volume, Eq. (8), in conjunction with the polynomial estimating the stress-strain curve allows theoretical volumetric energy density values to be obtained for different extension ratios of the material.

$$u = \int \sigma d\epsilon \tag{8}$$

Figure 13:
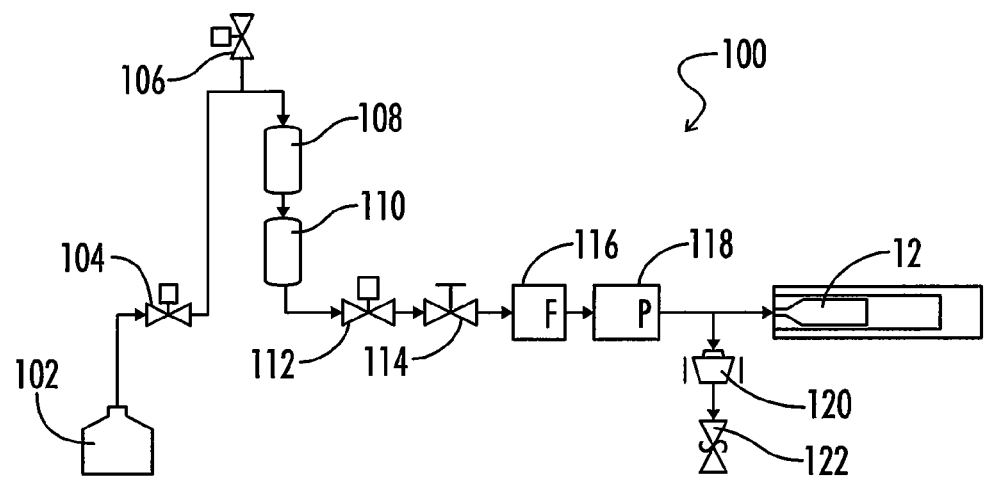
FIG. 13 is a schematic diagram of an embodiment of a structure for testing a bladder, as further described herein.

In Eq. (8), $\sigma$ is the stress (Pa), $\epsilon f$ is the extension ratio, and of is the extension ratio at which the volumetric energy density is to be calculated. For extensions between 400% and 600% ($\epsilon f=4$ and $\epsilon f=6$), this equation predicts bladder 12 to have a volumetric energy density between 25.6 MJ/m³ and 45.0 MJ/m³. Referring now to FIG. 13, there is shown the structure 100 for the bladder 12 that includes a 125 psig pressure source 102, attached to a first solenoid valve 104, which is attached to a second solenoid valve 106, which is attached to two 2-liter pressure tanks, 108 and 110, respectively. A third solenoid valve 112 is attached to the tanks 108 and 110, the third valve 112 being attached to an orifice valve 114, flow meter 116, pressure sensor 118, safety release valve 120, Schrader valve 122 and the bladder 12. A 125 psig (963 kPa) driving pressure acts to force water into the bladder 12. Initially, a line leading from solenoid valve (SV) 1 104 to the two 2 L pressure tanks, 108 and 110, is detached and the system from the tanks to the bladder 12 are filled with water. To ensure accurate results, the water-filled part of the system is bled of air by using a handheld vacuum pump attached at the Schrader valve 122. Additional water is poured into the tanks, 108 and 110, to make up for the losses resulting from the bleeding process. All SV's are then closed and the line leading from SV 1 104 is reattached to the pressure tanks.

Figure 14:
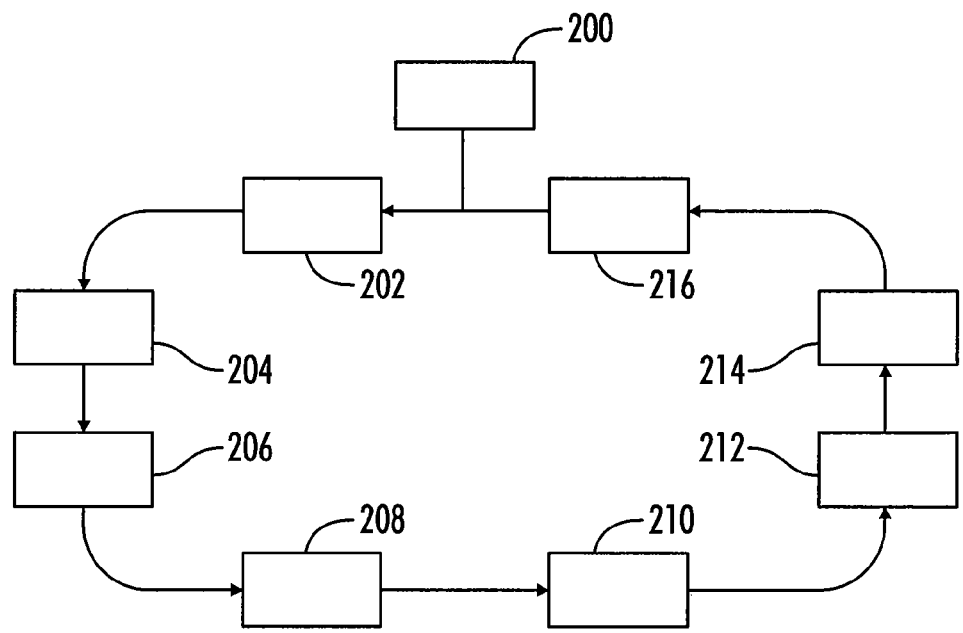
FIG. 14 is a schematic diagram of the steps of the method of operating the structure disclosed in FIG. 13.

All valve control and acquisition of sensor data is completed using a computer, as known to one of ordinary skill in the art. The manually adjustable orifice valve 114 is set to a specific position between separate test runs. Incrementally adjusting this valve allows determination of the effect of different rates of loading/unloading on energy storage. Each individual test run is conducted according to the steps of the method shown in FIG. 14. Briefly, the method starts 200, at the position indicated with the steps occurring as follows: (1) close SV 1, 2, and 3, 202, (2) open SV 1, 204, (3) open SV 3, 206, (4) close SV 3 after a period of time ($T_3$) elapses, 208, (5) close SV 1, 210, (6) open SV 2, 212, (7) after prescribed holding time ($T_h$) elapses, open SV 3 to release the working fluid, 214, and (8) wait for a period of time ($T_d$) for the system to become depressurized, 216.

The instantaneous readings from the flow meter (Q) 116 and pressure sensor (P) 118 are integrated as shown in Eq. (9) in order to obtain energy stored in, and retrieved from, the bladder 12, $$E = \int PQ dt \tag{9}$$

where $t_0$ is time at which SV 3 112 is opened and $t_f$ is time at which SV 3 112 is closed. When the water is flowing into the bladder 12 E in Eq. (7) represents energy stored ($E_{in}$) and $t_f - t_0 = T_3$. When the water is flowing out of the bladder 12, E in Eq. (7) represents the energy retrieved ($E_{out}$) and $t_f - t_0 = T_d$.

These values are used to calculate the volumetric accumulator energy density ($E_{v\rho}$), gravimetric accumulator energy density ($E_{g\rho}$) and energy efficiency ($\eta$) of the system. It is important to draw the distinction between the energy density values of the system 10 and those of the accumulator material. The difference is in that the energy densities of the system 10 include the weight and volume of the working fluid in their calculations, whereas the accumulator material energy densities do not. $E_{vp}$ is determined by using Eq. (10), $$E_{vp}=(E_{in})/V_0+\int Qdt \quad (10)$$

where $V_0$ is the original volume of the bladder 12 and the working fluid before the system 10 is pressurized. $E_{gp}$ is determined by Eq. (11), $$E_{gp}=(E_{in})/m_0+\int Qdt\cdot\rho_w \quad (11)$$

where $m_0$ is the original mass of the accumulator including the working fluid, before it is pressurized, and $\rho_w$ is the density of water. Lastly, $\eta$ is determined using Eq. (12).

$$\eta=(E_{out}/E_{in})\times 100\% \quad (12)$$

In order to determine whether a large number of loading/unloading cycles has a significantly detrimental effect on the energy storage capacity and efficiency of the bladder 12, $E_{vp}$, $E_{mp}$ and $\eta$ are measured several times for each position of the manually adjustable orifice valve.

Using the estimates for the volumetric energy density obtained for the previously mentioned extensions and the mass density of a bladder 12 constructed of Andur RT 9002 AP ($\eta_{PUa}\approx 1039$ kg/m3), the volume and mass of a bladder 12 capable of storing 195 kJ was approximated. The bladder 12 was predicted to be manufactured from 0.0043 $m^3$ to 0.0076 $m^3$ of material and to weigh somewhere between 4.50 kg and 7.90 kg, depending on the extension ratio used. Adding these values to the working fluid projections discussed earlier, estimates for the system energy density were made. Approximated parameters are shown below and should be viewed as estimates since their derivation did not include the initial volume of working fluid in the bladder 12 prior to loading (expected to be small relative to the final volume of hydraulic fluid to be stored in the bladder), and other system components such as the equipment necessary for controlling the flow of working fluid. Estimated system energy density (system defined as elastomer material and portion of hydraulic fluid used for energy storage): System Volume (liters): 10.3 (upper bound), 16.6 (lower bound); System Mass (kg): 9.57 (upper bound), 16.27 (lower bound); System Volumetric Energy Density (MJ/$m^3$): 18.93 (upper bound), 11.27 (lower bound); System Gravimetric Energy Density (kJ/kg): 20.38 (upper bound), 11.99 (lower bound).

Figure 15:
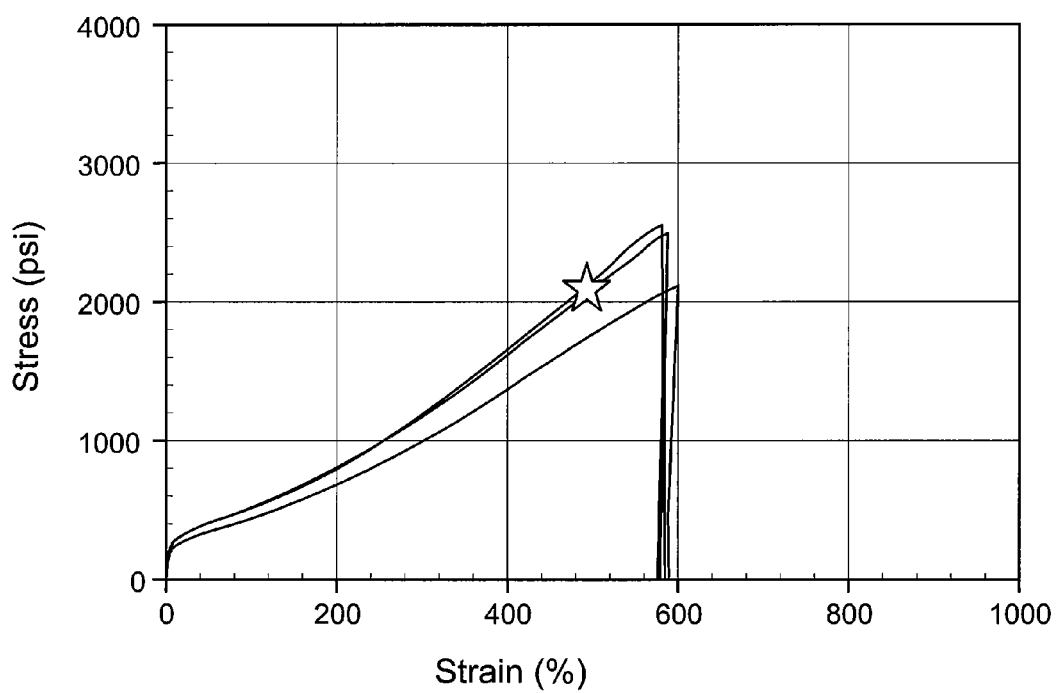
FIG. 15 shows three stress-strain curves for three samples of a material called NBR 6212, as further described herein.

Referring now to FIG. 15, there are shown stress-strain curves for three separate samples of an existing formulation of a nitrile rubber identified as NBR 6212 and manufactured by the Gates Corporation. The stress-strain curves for this material show the useable volumetric strain energy density of the material to be 33 MJ/$m^3$, which is marked by a "star." Provided a bladder manufactured from this material, and capable of storing fluid pressurized to 34.5 MPa, exhibits the same relatively constant pressure volumetric expansion as other hyperelastic materials such as rubber, equation 3 can be used to arrive at a system energy density in the following manner:

To store 200 kJ:
  Material volume required: 200 kJ/33 MJ/$m^3$=0.0061 $m^3$ (6.1 L)
  Fluid volume required: 200 kJ/34.5 MJ/$m^3$=0.00565 $m^3$ (5.65 L)
  Total volume required: 0.0061 $m^3$+0.00565 $m^3$=0.01175 $m^3$ (11.75 L)
  Ideal volumetric system energy density: 200 kJ/0.01175 $m^3$≈17 MJ/$m^3$ The ideal volumetric system energy density for an accumulator 10 composed of NBR 6212 is slightly smaller than the stated upper bound on the volumetric system energy.

Embodiments of the Present Invention

Figure 9:
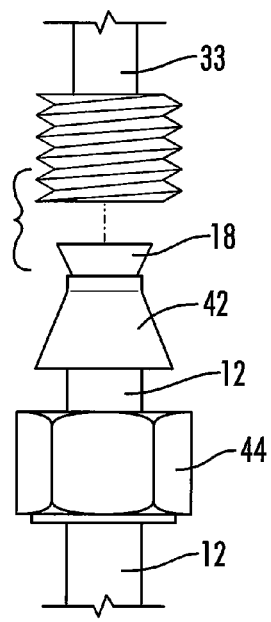
FIG. 9 is a side view of an embodiment of the connection of the bladder to a fluid conduit. Shown therein is the neck of the bladder surrounded by a compression ring and a coupling nut. The neck of the bladder comes in fluid connection with the fluid conduit when the coupling nut fastens to the threaded portion of the fluid conduit.

Referring now to FIG. 2, there is shown a cross-sectional view of the system 10. Shown in FIGS. 2-4, is a progression of the expansion of the bladder 12 as a fluid 30 is pressured by the pump/motor 20 into entering and expanding the bladder 12. The direction of the flow of the fluid 30 is shown by the arrows in each figure. Generally, radial expansion of the bladder 12 initiates near the neck 18 of the bladder 12. Radial expansion of the bladder 12 is limited by the housing 14. As shown in the progression of FIGS. 2-4, radial expansion of the bladder 12 extends axially along the bladder 12. The body 22 of the bladder 12 is expanded from its original shape, a first configuration, shown in FIG. 2, to a second configuration, which is storing energy, shown in FIG. 4. During that transformation the effective size and shape of the reservoir 16 changes because the bladder 12 is one of the sides of the reservoir 16. In certain embodiments, the manner of connecting the bladder 12 to the second fluid conduit 33 is shown in FIG. 9. The first fluid conduit 31 and second fluid conduit 33 may be constructed of any material which is proper for the use and function described herein. Examples of such conduits are well known to those of ordinary skill in the art, and include hydraulic hose, hydraulic piping, or the like. In certain embodiments, connecting the first fluid conduit 31 and the second fluid conduit 33 to the pump/motor 20 includes standard fluid tight connections known to those of ordinary skill in the art, which are well known and readily commercially available. Such connections may include a compression fitting connection as fully described in FIG. 9. In other embodiments, connecting the first fluid conduit 31 to the second opening 27 of the housing 14 includes standard fluid tight connections known to those of ordinary skill in the art, which are well known and readily commercially available. Such a connection may include a compression fitting connection as fully described in FIG. 9. In certain embodiments, connecting the seal 35 of the second fluid conduit 33 to the first opening 26 of the housing 14 includes a threaded engagement, or the like, in order to provide a fluid tight junction. Regarding any of the fluid tight junctions described herein, connectors for providing such junctions are well known to those of ordinary skill in the art and the materials needed for the same are readily commercially available.

As used herein, the bladder 12 may also be referred to as an expansion member, or other suitable term which is descriptive of the functions disclosed herein. In certain embodiments, the bladder 12 is constructed of a material capable of performing the functions described herein. In certain embodiments of the invention, the bladder 12 is an elastomer. In other embodiments, the bladder 12 is polyurethane, nitrile rubber, polyisoprene, or natural rubber. Such materials are readily commercially available, such as from Gates Rubber Corporation of Denver, Colo. In certain embodiments of the present invention, the bladder 12 may be constructed of Gates Corporation's NBR 6212 nitrile rubber. In still other embodiments of the present invention, an appropriate energy storing material for the bladder 12 is a material having a high volumetric energy density, a high gravimetric (or mass specific) energy density, and the ability to store the captured energy efficiently for a duration on the order of minutes. In still other embodiments of the present invention, the bladder 12 may be constructed of another known material which is suitable as known to those of ordinary skill in the art. Those of ordinary skill in the art are familiar with the molding and construction techniques that are used to manufacture a bladder 12 having the qualities and characteristics as described herein. Further, those manufacturing services are readily commercially available.

Efficient Energy Storage by the Bladder

As used herein, yield strength has the same meaning as is known to one of ordinary skill in the art. That is, the yield strength of a material is the stress at which the material begins to deform plastically. A minimum yield strength means that the material has a yield strength of at least the given psi. For example, in certain embodiments of the present invention, the bladder 12 has a minimum yield strength of about 1000 psi.

In certain embodiments of the present invention, the material of construction of the bladder 12 is a material exhibiting elastic behavior to strains of at least 1. Stress-strain curves were initially discussed above in this application. Stress-strain curves provide information about the expansion behavior of a material. A number of elastomeric materials display hyperelastic expansion behavior. Such materials are highly desirable for use as a bladder 12. These materials can be fabricated into highly stretchable bladders capable of producing relatively flat pressure-volume curves for a range of fill volumes. That is, as volume increases, pressure remains constant. Another favorable characteristic observed in smaller bladders made of hyperelastic material, and one which is highly desirable in bladder 12, is the absence of statistically significant decreases in energy density and roundtrip efficiency all the way up to failure. Fatigue testing of smaller scale prototypes of bladders 12 show no degradation of performance characteristics up until failure. Building of an initial finite element analysis model use ABAQUS software, which is commercially available under the SIMULIA brand of Dassault Systemes S.A., having offices in Providence, R.I. Accordingly, materials which can be used to create fluid containers having pressure-volume curves that are generally flat are desirable materials for use in the construction of the bladder 12.

As best seen in the FIGS. 1-7, the bladder 12 is housed within the housing 14, and may be a generally cylindrical shape. In still other embodiments of the present invention, the bladder 12 may be a similar shape, such as an oval, octagon, hexagon, or the like, as generally known to those of skill in the art. Accordingly, in certain embodiments of the present invention, the housing 14 may also have such similar shapes.

In certain embodiments of the present invention, the bladder 12 may have a length of from about 30 to about 40 inches. In other embodiments, the length may be from about 31 inches to about 35 inches. In certain embodiments of the present invention, the bladder 12 may have an unexpanded outer surface diameter of about 4 inches and an inner surface diameter of about 2 inches, meaning that the bladder 12 has a thickness of about 1 inch. In other embodiments of the invention, the thickness of the bladder 12 at the closed end 36 has a thickness of about 4 inches.

In certain embodiments of the invention, the proportions of the housing 14, also referred to as a reservoir 16, are in relation to the size characteristics of the bladder 12. The housing 14 serves to limit the radial expansion of the bladder 12 to a point of expansion that is less than the maximum unconstrained radial expansion of the bladder 12. The housing 14 also defines the size and shape of the reservoir 16. The housing 14 provides the rigid boundaries of the reservoir 16 and the bladder 12, upon expansion, further influences the exact volume of the reservoir 16. Use of a housing 14 has been shown to extend the small scale bladders' fatigue lives by a factor of 4.5 when the housing 14 limits the bladder's 12 maximum outer diameter during expansion to that of about 63% of the outer diameter achieved when expansion is unrestricted. Accordingly, in certain embodiments of the present invention, the housing 14 limits the bladder's 12 maximum outer diameter during expansion to from about 50% to about 70% of the outer diameter achieved when expansion is unrestricted. In yet other embodiments of the present invention, the housing 14 limits the bladder's 12 maximum outer diameter during expansion to from about 60% to about 65% of the outer diameter achieved when expansion is unrestricted. In still other embodiments of the present invention, the housing 14 limits the bladder's 12 maximum outer diameter during expansion to about 63% of the outer diameter achieved when expansion is unrestricted. Further, use of a housing 14 achieves higher holding pressures, a higher energy density, and serves to distribute stress more evenly throughout the bladder 12. Accordingly, in relation to the size characteristics of the bladder 12 disclosed in the paragraph above, in certain embodiments, the housing 14 may have a length of from about 55 inches to about 65 inches. In other embodiments of the present invention, the length of the housing 14 may be about 59 inches to about 63 inches. In certain embodiments of the present invention, the diameter of the housing 14 is about 8.25 inches. In still other embodiments of the present invention, the diameter of the housing 14 may be from about 7 inches to about 9 inches. In still other embodiments of the present invention, the thickness of the housing 14 may be from about 0.12 inches to about 0.14 inches. In yet other embodiments of the invention, the thickness of the housing 14 may be from about one eighth of an inch to about one fourth of an inch. As known of those in the ordinary skill in the art, the thickness of the housing 14 is dependent upon the desired maximum rated pressure for the housing 14. In certain embodiments of the invention, the housing 14 has a pressure rating of at least 2000 psi. As further noted below, those of ordinary skill in the art understand that the dimensions of the present invention may change as the desired energy storage capacity changes.

Still referring to the housing 14, in addition to thickness, the material of construction is relevant. In certain embodiments of the present invention, the material of construction of the housing 14 is a rigid structural material capable of providing fluid tight containment of the fluid 30 which will be held in the reservoir 16 space. In certain other embodiments of the present invention, the housing 14 is constructed of steel, carbon fiber, polycarbonate, woven pressure vessel materials, fiberglass, aluminum, or the like. In certain embodiments of the invention, the housing 14 may include a lining of appropriate material to complement the fluid bearing function which the housing 14 serves. Those of ordinary skill in the art are familiar with such materials, which are readily commercially available. Methods of fabricating a housing 14 of such materials are well known to those of ordinary skill in the art, and such fabrication services are readily commercially available. As known to those of ordinary skill in the art, the invention disclosed herein is scalable to accomplish the magnitude of desired energy storage. Accordingly, while specific dimensions are provided herein, one of ordinary skill in the art is familiar with the modification of those dimensions in order to accomplish specific energy storage characteristics based upon the industry in which the system 10 is applied.

Referring now to FIGS. 5-7, there is shown a progression of schematics regarding capturing the strain energy stored in the bladder 12. Specifically, FIG. 5 shows a full bladder 12 that is starting to release fluid 30. In each figure, the direction of the flow of the fluid 30 is shown by the arrows. The fluid 30 travels through the second conduit 33 to the pump/motor 20. In certain embodiments, the pump/motor 20 has its axle 21 rotated as a result of the moving fluid 30. In other embodiments, the mechanism of the pump/motor 20 may differ, yet it is still the movement of the fluid 30 which results in energy that is available for use. Use of the energy includes rotating an axle 21 for vehicle acceleration, as further described below. Referring now to FIG. 6, the fluid 30 continues to be released from the bladder 12 due to the strain energy. After passing through the pump/motor 20, it travels through the first conduit 31 and then into the reservoir 16, which is defined by the housing 14 and the bladder 12. Referring now to FIG. 7, there is shown a bladder 12 returned to its original, unstrained configuration. The system 10 is now ready to initiate another cycle as previously described.

Figure 8:
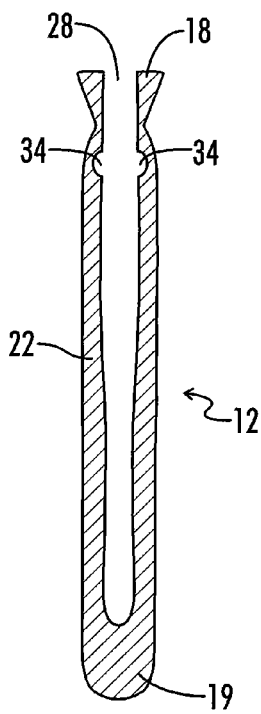
FIG. 8 is a cross-sectional view of an embodiment of the bladder described herein. Shown therein are notches, axisymmetric or otherwise, near the opening of the bladder which reduce the wall thickness of the bladder in order to promote the initiation of radial expansion of the bladder at that location.

Referring now to FIG. 8, there is shown a cross-sectional view from the side of the bladder 12. In the embodiment of the bladder 12 shown, notches 34 are present near the neck 18 of the bladder 12 in order to reduce the thickness of the bladder 12. The thinner wall at that particular location results in an initiation point for the radial expansion of the bladder 12. Accordingly, as best seen in FIGS. 2-4, radial expansion initiates near the neck 18 of the bladder 12 and proceeds axially down the length of the bladder 12. Such expansion reduces the chance of undesirable effects associated with the unpredictable expansion of the bladder 12, such as bending, twisting or jamming. The particular shape of the notches 34, such as oval, or the like, are known to those of skill in the art.

Referring now to FIG. 9, there is shown an embodiment of the present invention in which the bladder 12 has a neck 18 which extends beyond the housing 14. In certain embodiments of the present invention, the neck 18 may be from about one and one half inches to about three and one half inches in length. FIG. 9 shows the individual parts of the clamp 40 that attaches the neck 18 of the bladder 12 to a second fluid conduit 33. Specifically, there is shown a side view of the coupling nut 44 that slides over the compression ring 42 and threadably engages the threaded element of the second fluid conduit 33. Upon rotation of the coupling nut 44, the bladder 12 is in fluid communication with the second fluid conduit 33. In certain embodiments of the present invention, the compression fitting described in this paragraph may be used for the other connections shown and described herein. In still other embodiments, other types of clamps or connections resulting in fluid communication are known to those of ordinary skill in the art.

Referring now to the housing 14, the housing 14 has an opening 26 which, in certain embodiments, has a diameter of from about 4.25 inches to about 6.25 inches. In certain embodiments, the opening 26 of the housing 14 is sized so that the bladder 12 attached to the second fluid conduit 33 may be inserted there through so that the bladder 12 is replaceable, as it is likely that a bladder 12 may need to be replaced in advance of replacement of the housing 14. Accordingly, in certain embodiments of the present invention, while the neck 18 of the bladder 12 may contact the housing defining the opening 26, the bladder 12 and the housing 14 are not directly connected. The bladder 12 is positioned within the housing 14. The second fluid conduit 33, by way of the seal 35, is attached to the housing 14. In still other embodiments of the present invention, the bladder 12 may be directly attached to the housing 14. In any event, the bladder 12 is installed within the housing 14 so that it does not fold, twist, or otherwise experience undesirable strain that would interfere with its function as described herein. In still other embodiments of the present invention, the system 10 may be in use in a vehicle such that the housing 14 is fixedly attached to a structure component of the vehicle which is near. In still other embodiments of the present invention, the housing 14 may be attached to the clamp 40.

Figure 10:
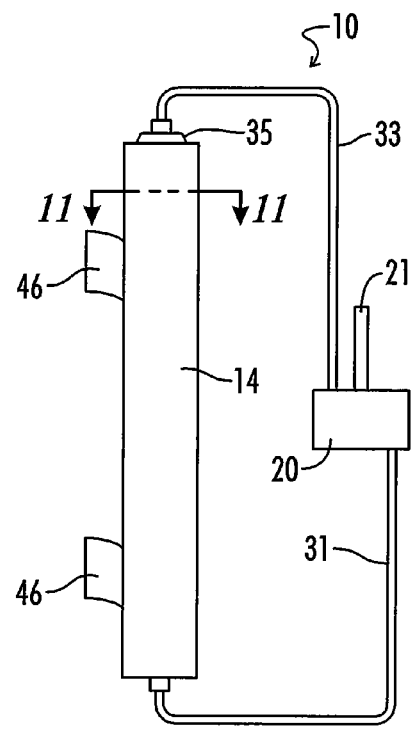
FIG. 10 is a side view of an embodiment of the present invention. Shown therein is the housing which contains the accumulator and reservoir. The housing is in fluid communication with the conduits which attach it to the pump/motor. As hydraulic fluid passes through the fluid conduit into the bladder, which is within the housing, strain energy is stored and the volume of the reservoir is correspondingly reduced. The present invention will release its stored strain energy in the form of hydraulic energy as the fluid exits the bladder; the flow out of the bladder will be driven by the pressure due to the bladder's forceful contraction. The fluid goes to the reservoir. The housing is mounted to the vehicle (not shown), possibly as brackets, in order to position the system in a stable manner.

Referring now to FIG. 10, there is shown an embodiment of the system 10 which may be in use in a vehicle. At least one point of novelty of the system 10 is that the reservoir 16 is built into the accumulator. That is, the fluid 30 being pumped into the bladder 12 is from the reservoir 16 which is within the same housing 14 as the bladder 12. The system 10 includes a pump/motor 20, be it a hydraulic pump or another mechanism capable of providing flow at desirable pressure. Such pump/motors are readily commercially available and well known to those of ordinary skill in the art. Examples of commercially available pump/motors 20 include variable displacement hydraulic pump/motors, or the like. The pump/motor 20 will be the energy source which will serve to provide the system 10 with energy via a fluid flow, which the system 10 will store as strain energy. Likewise, the system 10 can return its stored energy by providing a flow at a high pressure to the pump/motor 20 or other fluid powered device. In a vehicular system, such a fluid 30 may be hydraulic fluid. In the embodiment shown in FIG. 10, the pump/motor 20 moves the hydraulic fluid at sufficient pressure to push the hydraulic through the second fluid conduit 33 and into the bladder 12 of the system 10. In certain embodiments of the present invention, the housing 14 may be attached to a single bracket 46 or a plurality of brackets 46, so that the housing 14 is attached to the vehicle (not shown) through such brackets 46.

By way of example, as a vehicle rolls to a stop, the pump/motor 20 starts pumping fluid 30 into the bladder 12. The pump/motor 20 is physically connected to the power train of the vehicle. By the time the vehicle comes to a stop the bladder 12 will have partially or fully expanded. As the vehicle starts to move, the pump/motor 20 reverses its function so that the pressurized fluid in the bladder 12 is released and the strain energy is used to assist the vehicle in acceleration. The process may be repeated again regardless of whether or not the bladder 12 returns to its unstrained shape. As known to those of ordinary skill in the art, such an embodiment may use hydraulic actuators and valves. Such actuators and valves are well known in the art and are readily commercially available.

In yet another embodiment, the invention disclosed herein may be used for short term storage of energy. By way of illustration, and not limitation, such short term energy storage, such as, for peak shifting in relation to energy use of buildings. For this application, the pump/motor would engage an electric motor and/or generator.

Figure 11:
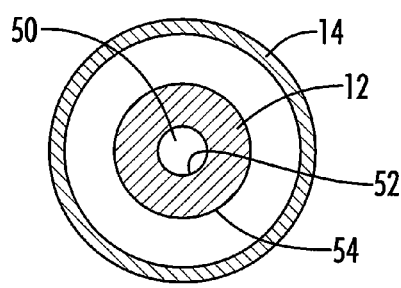
FIG. 11 is a cross-sectional view along the line shown in FIG. 10 of the embodiment of the present invention shown in that figure. Shown therein is the housing and bladder.
Figure 12:
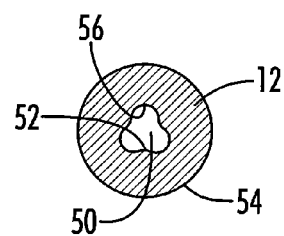
FIG. 12 is a cross-sectional view of an alternate embodiment of the bladder. Rather than having a circular inner surface, as shown for the bladder embodiment of FIG. 11, this alternate embodiment has an inner surface with grooves.

Referring now to FIG. 11, there is shown the thickness of bladder 12. The bladder 12 also has an inner surface 52 and an outer surface 54. The bladder 12 defines a bladder cavity 50. FIG. 11 is a cross-sectional view along the cross-sectional line shown in FIG. 10. In certain embodiments of the present invention, the inner surface 52 of the bladder 12 is circular, as shown in FIG. 11. In alternate embodiments of the present invention, the inner surface 52 of the bladder 12 is not circular, and may have a multi-lobed oval shape, as best seen in FIG. 12. In certain embodiments of the present invention, the inner surface 52 of the bladder 12 has grooves 56 which may assist in the longevity of the bladder 12 as it repetitively expands from a first configuration to a second configuration, and then returns to the first configuration.

All references, publications, and patents disclosed herein are expressly incorporated by reference.

Thus, it is seen that the accumulator/reservoir system of the present invention readily achieves the ends and advantages mentioned as well as those inherent therein. While certain preferred embodiments of the invention have been illustrated and described for purposes of the present disclosure, numerous changes in the arrangement and construction of parts may be made by those skilled in the art, which changes are encompassed within the scope and spirit of the present invention, as defined by the following claims.

What is claimed is:

1. An accumulator system, comprising:
    a housing, wherein the housing defines a reservoir;
    a seal attached to the housing, wherein the seal is attached to the housing by a threaded engagement;
    a bladder attached to the seal, wherein the bladder is contained within the housing;
    a fluid, wherein the fluid is inside the bladder and in the reservoir surrounding the bladder.

2. The accumulator system of claim 1, wherein the fluid is a hydraulic fluid.

3. The accumulator system of claim 1, further comprising a pump/motor in fluid communication with the bladder and reservoir.

4. The accumulator system of claim 2, further comprising:
    a first fluid conduit attached to the housing and the pump/motor;
    a second fluid conduit attached to the pump/motor and the seal.

5. The accumulator system of claim 4, wherein the seal has a diameter greater than a diameter of the bladder so that removal of the seal allows for removal and replacement of the bladder.

6. A compact accumulator system, comprising:
    a fluid reservoir having a first opening;
    a seal attached to the first opening of the fluid reservoir by threaded engagement,
    a bladder attached to the seal and in fluid communication with the fluid reservoir, wherein the fluid reservoir contains the bladder so that the accumulator system is compact;
    a fluid in communication with the bladder and the fluid reservoir;
    a pump/motor in fluid communication with the bladder and the fluid reservoir.

7. The compact accumulator system of claim 6, wherein the accumulator system is a closed system.

8. The compact accumulator system of claim 6, wherein the accumulator system is an open system.

9. A compact accumulator system, comprising:
    a fluid reservoir;
    a bladder in fluid communication with the fluid reservoir, wherein the fluid reservoir and the bladder are contained within the same structure so that the accumulator system is compact;
    a fluid in communication with the bladder and the fluid reservoir;
    a pump/motor in fluid communication with the bladder and the fluid reservoir;
    wherein the accumulator system is an open system;
an overflow reservoir in fluid communication with the fluid reservoir and the pump/motor so that the opening to atmospheric pressure is on the low pressure side of the system.

10. The compact accumulator system of claim 6, further comprising a bracket attached to the housing so that the system may be mounted for energy use.

11. The accumulator system of claim 1, further comprising a liner attached within the housing so that sliding friction and wear on the bladder are reduced and fluid bearing of the housing is enhanced.

* * * * *